US007548791B1

(12) United States Patent
Johnston

(10) Patent No.: US 7,548,791 B1
(45) Date of Patent: Jun. 16, 2009

(54) GRAPHICALLY DISPLAYING AUDIO PAN OR PHASE INFORMATION

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 428 days.

(21) Appl. No.: 11/437,516

(22) Filed: May 18, 2006

(51) Int. Cl.
*G06F 17/00* (2006.01)

(52) U.S. Cl. ............................ 700/94; 381/56; 715/716

(58) Field of Classification Search ................... 381/56, 381/57, 58
See application file for complete search history.

(56) References Cited

U.S. PATENT DOCUMENTS 4,491,701 A * 1/1985 Duttweiler et al. .......... 708/322
4,691,358 A * 9/1987 Bradford ..................... 381/12
5,812,688 A * 9/1998 Gibson ....................... 381/119
6,014,447 A * 1/2000 Kohnen et al. ................ 381/86
6,021,204 A * 2/2000 Eastty ......................... 381/56
2005/0226429 A1* 10/2005 Hollowbush et al. .......... 381/56

OTHER PUBLICATIONS

Free Audio Analyzer Gains Pro Tools Support, More, http://web.archive.org/web/20031219065625/http://news.harmony-central.com/Newsp/2003/Inspector-12.html (archived by WayBack Machine Dec. 19, 2003) (retrieved Sep. 14,, 2008) ("Harmony Central").*

* cited by examiner

*Primary Examiner*—Walter F Briney, III
(74) *Attorney, Agent, or Firm*—Fish & Richardson P.C.

(57) ABSTRACT

Systems, methods, and computer program products for displaying visual representations of features of audio data are provided. In one implementation, a computer-implemented method is provided. Audio data is received. A visual representation of the audio data showing pan position is displayed. Displaying the visual representation includes calculating pan position data comprising one or more pan positions associated with audio data per unit time and plotting the calculated pan position data.

32 Claims, 5 Drawing Sheets
(2 of 5 Drawing Sheet(s) Filed in Color)

GRAPHICALLY DISPLAYING AUDIO PAN OR PHASE INFORMATION

BACKGROUND

The present disclosure relates to displaying visual representations of features of audio data.

Different visual representations of audio data are commonly used to display different features of audio data. For example, visual representations can include a frequency spectrogram display, which shows a representation of various frequencies of the audio data in the time-domain (e.g., a graphical display with time on the x-axis and frequency on the y-axis). Similarly, an amplitude display shows a representation of audio intensity in the time-domain (e.g., a graphical display with time on the x-axis and intensity on the y-axis). However, these visual representations do not provide information associated with the spatial location, phase, or other features of the audio data.

SUMMARY

In general, in one aspect, a computer-implemented method and computer program product is provided. Audio data is received. A visual representation of the audio data showing pan position is displayed. Displaying the visual representation includes calculating pan position data comprising one or more pan positions associated with audio data per unit time and plotting the calculated pan position data.

Implementations can include one or more of the following features. Calculating the pan position data can include separating the audio data into a set of blocks. A fast Fourier transform is performed on each block to separate the audio data of the block into one or more frequency bands. The pan position is calculated for each frequency band. Calculating a pan position for each frequency band can include comparing the amplitude of audio data associated with the frequency band corresponding to a left audio channel and a right audio channel.

Plotting the calculated pan position data can include creating a histogram for each block relating the one or more frequency bands to pan position and plotting pan position data over time using data from each created histogram. Plotting the calculated pan position can include identifying a brightness level associated with each plotted pan position. The brightness level can indicate a relative amount of the audio data for that particular pan position at a given point in time. Plotting the calculated pan position can include associating a color with each plotted pan position. The color can indicate the frequencies of the audio data for that particular pan position at a given point in time. The method can further include receiving an input to perform one or more editing operations using the displayed audio data.

In general, in one aspect, a computer-implemented method and computer program product is provided. Audio data is received. A visual representation of the audio data showing phase difference is displayed. Displaying the visual representation includes calculating phase difference data comprising one or more phase difference values associated with audio data per unit time and plotting the calculated phase difference data.

Implementations can include one or more of the following features. Calculating the phase difference data can include separating the audio data into a set of blocks. A fast Fourier transform is performed on each block to separate the audio data of the block into one or more frequency bands. The phase difference is calculated for each frequency band. Calculating a phase difference for each frequency band can include calculating the phase of audio data associated with the frequency band corresponding to a left audio channel and a right audio channel and calculating the difference between the phase of the left audio channel and the right audio channel.

Plotting the calculated phase difference data can include creating a histogram for each block relating the one or more frequency bands to phase difference and plotting phase difference data over time using data from each created histogram. Plotting the calculated phase difference can include identifying a brightness level associated with each plotted phase difference. The brightness level can indicate a relative amount of the audio data for that particular phase difference at a given point in time. Plotting the calculated phase difference can include associating a color with each plotted phase difference. The color can indicate the frequencies of the audio data for that particular phase difference at a given point in time.

In general, in one aspect, a system is provided. The system includes means for receiving audio data and means for displaying a visual representation of the audio data showing pan position. The means for displaying a visual representation includes calculating pan position data comprising one or more pan positions associated with audio data per unit time and plotting the calculated pan position data.

In general, in another aspect, a system is provided. The system includes a graphical user interface configured to present a display of audio data. The graphical user interface includes a first axis indicating displacement to the left and right of a center value, a second axis indicating time, and a plot of pan position with respect to displacement and time.

Particular embodiments of the invention can be implemented to realize one or more of the following advantages. A pan position display can be generated, which allows a user to visually identify the location of audio data with respect to time. The user can use the pan position display, for example, to adjust the positioning of microphones (e.g., real or virtual microphones) for audio recording. Additionally, the user can use the pan position display to identify the location of particular audio constituents of the audio data. The user can also identify the intensity of the audio data at particular pan positions as well as the particular frequencies of a given pan position. Furthermore, a phase display allows the user to see changes in phase of audio data with respect to time. The phase display also allows the user to identify synchronization errors between channels of the audio data (e.g., tape azimuth and alignment errors). The user can use the information provided by the visual representations to analyze or edit the audio data.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The application file contains at least one drawing executed in color. Copies of this patent application publication with color drawing(s) will be provided by the Office upon request and payment of the necessary fee.

Like reference numbers and designations in the various drawings indicate like elements.

DETAILED DESCRIPTION

Figure 1:
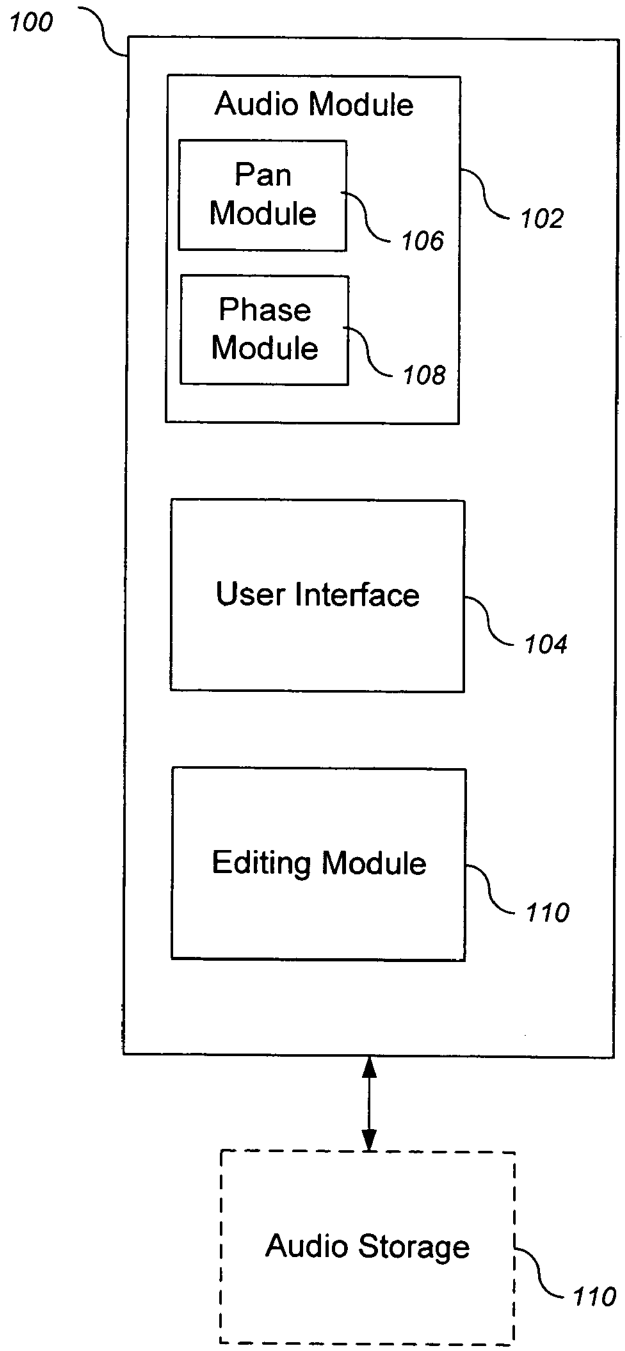
FIG. 1 is a block diagram of an example audio display system.

FIG. 1 is a block diagram of an example audio display system 100 for use in displaying audio data. The audio display system 100 includes an audio module 102 and a user interface 104. The audio module 102 includes a pan module 106 and a phase module 108. The audio display system 100 can optionally include an editing module 110.

Audio module 102 analyzes a received audio file and extracts the audio data. Audio files can be received by the audio module 102 from audio storage within the audio system 100, from an external source such as audio storage 110, or otherwise (e.g., from within a data stream, received over a network, or from within a container document, for example, an XML document). The audio module 102 determines the form of visual representation for displaying extracted audio data in the user interface 104. For example, the audio module 102 can make the determination in response to a user input or according to one or more default display parameters. The extracted audio data from the audio file can be displayed in a number of different visual representations including, for example, an amplitude display, frequency spectrogram display, a pan position display, and a phase display.

Audio storage 110 can be one or more storage devices, each of which can be locally or remotely located. The audio storage 110 responds to requests from the audio editing system 100 to provide particular audio files to the audio module 102.

The user interface 104 provides a graphical interface for displaying audio data. For example, the user interface 104 can display a pan position display of the audio data using information received from the pan module 106. Alternatively, the user interface 104 can display a phase display of the audio data using information received from the phase module 108. The user interface 104 also allows the user to identify and request a particular audio file. Additionally, the user interface 104 provides various tools and menus that a user can use to interact with the displayed audio data.

The pan module 106 processes the audio data of an audio file to plot the pan locations of the audio data with respect to time. The pan module 106 processes the audio data to separate the audio data according to pan position for a number of frequency bands per unit time. The pan module 106 can also associate different frequency bands with one or more visual identifiers (e.g., brightness, color) in order to generate a pan position display that visually provides concentration and/or frequency information.

The phase module 108 processes audio data of an audio file to plot phase information of the audio data with respect to time. The phase module 108 processes the audio data to identify phase differences for a number of frequency bands per unit time. The phase module 108 can also associate different frequency bands with one or more visual identifiers (e.g., brightness, color) in order to generate a phase display that visually provides concentration and/or frequency information.

The optional editing module 108 performs one or more editing operations on the displayed audio data. Editing operations can be performed in response to a user input, for example, though user interactions with the user interface 104. Editing operations can include, for example, the removal of the particular portions of the audio data from the displayed audio data as well as the processing of the audio data to generate one or more particular effects. For example, audio effects include amplifying, pitch shifting, flanging, reversing, and attenuating. Other editing operations can be performed, for example, a portion of the audio data can be copied and pasted to a different portion of the displayed audio data.

Figure 2:
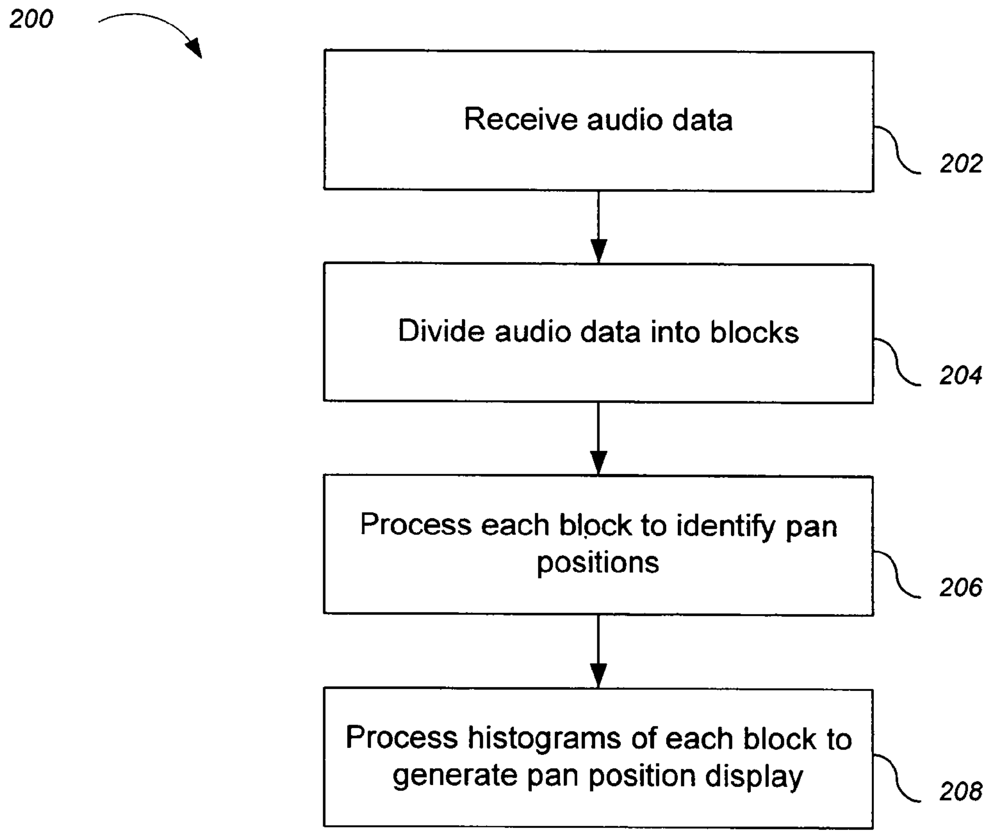
FIG. 2 shows an example process for generating a pan position display of audio data.

FIG. 2 shows an example process 200 for generating a pan position display of audio data. For convenience, the process will be described with reference to a computer system that performs the process 200. The system receives an audio file (e.g., from audio storage 110) (step 202). The audio file is received, for example, in response to a user selection of a particular audio file.

The system divides the received audio data into a number of blocks with respect to time (step 204). In one implementation, the blocks represent rectangular units, each having a uniform width (block width) in units as a function of time. Thus, the blocks represent a series of vertical slices of the audio data in the time domain. The block width depends on the type of processing being performed. For example, the size of a fast Fourier transform ("FFT") selected for use in processing the blocks varies the width of the blocks. Thus, the selected FFT can be determined according to a balance between the desired pan resolution and the desired time resolution. For example, a selected FFT that provides a greater resolution in the time-domain results in a corresponding decrease in pan resolution for the block. Each block is processed to identify pan positions associated with the audio data of the block (step 206).

Figure 3:
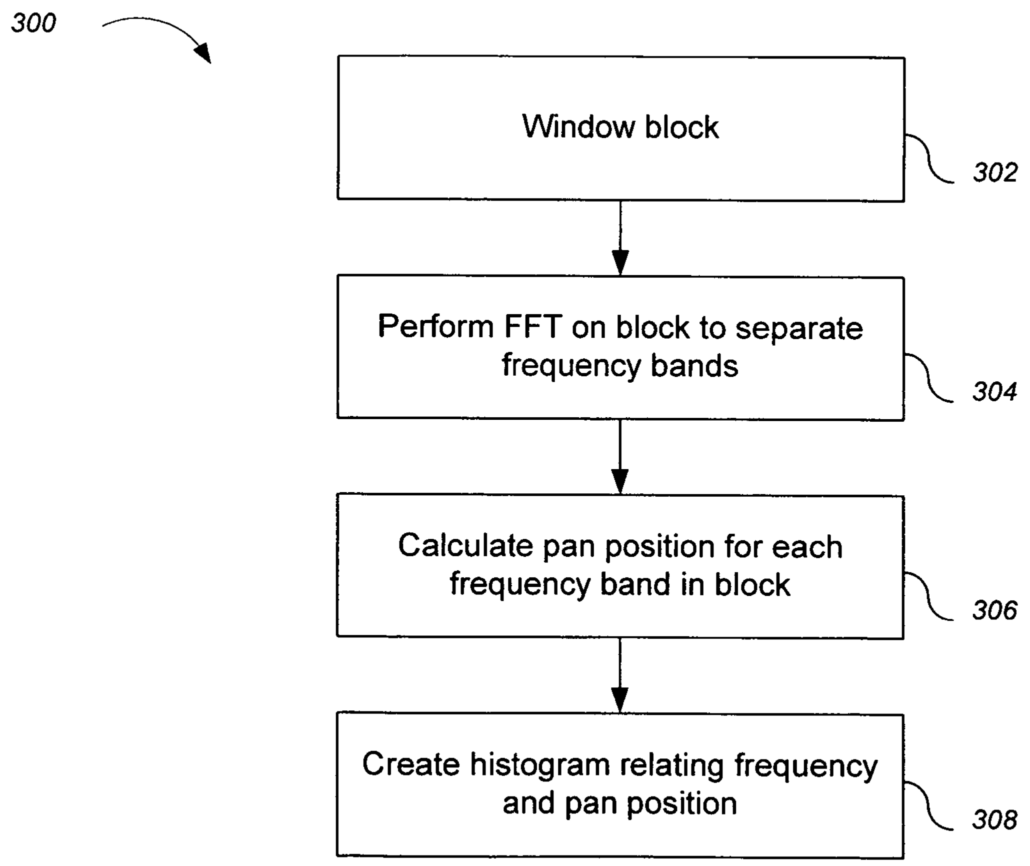
FIG. 3 shows an example process for processing blocks of audio data.

FIG. 3 shows an example process 300 for processing each block of audio data. For simplicity, the block processing steps are described below for a single block as a set of serial processing steps, however, multiple blocks can be processed substantially in parallel (e.g., a particular processing step can be performed on multiple blocks prior to the next processing step).

The block is windowed (step 302). The window for a block is a particular window function defined for the block. A window function is a function that is zero valued outside of the region defined by the window (e.g., a Blackman-Harris, Kaiser, Hamming, or other window function). Thus, by creating a window function for each block, subsequent operations on the block are limited to the region defined by the block. Therefore, the audio data within each block can be analyzed in isolation from the rest of the audio data using the window function.

An FFT is performed to extract the frequency components of a vertical slice of the audio data over a time corresponding to the windowed block (step 304). The FFT separates the individual frequency components of the audio data from zero hertz to the Nyquist frequency. Thus, for each vertical slice of audio data, the frequency components are separated. The FFT can be used to provide a high frequency resolution, separating the audio data into individual frequencies. Alternatively, the FFT can be used to sort the audio data into a series of frequency bands (e.g., 100-200 Hz, 200-300 Hz, etc.).

A pan position is calculated for each frequency band in the block of audio data (step 306). In one implementation, the amplitude difference between audio signals associated with a left and a right audio channel is used to calculate the particular pan position associated with each frequency band. Each audio channel corresponds to a stream of audio data related by a common time. Other techniques can be used to calculate pan positions of the frequency bands, for example, when the audio data includes more than two channels. The pan position is calculated as a relative percentage of displacement from a center that varies from −100 (max left) to +100 (max right).

The particular pan position can be calculated by first determining whether the amplitude of the right channel is greater than the amplitude of the left channel for the audio data associated with the particular frequency band. If the amplitude of the right channel is greater, the pan position is calculated as a ratio of the amplitude of the right and left channels as:

$$Pan = 100 * \left(1 - \frac{AmplitudeL}{AmplitudeR}\right)$$

If the amplitude of the right channel is less than the amplitude of the left channel, then the pan position is an inverse ratio of the channel amplitudes as:

$$Pan = -100 * \left(1 - \frac{AmplitudeR}{AmplitudeL}\right)$$

The calculation is repeated to calculate the pan position for each frequency band extracted from the block.

A histogram is generated relating frequency and pan position (step 308). The histogram identifies which, and how many, frequency bands are located at each pan position. For example, multiple frequency bands can have the same calculated pan position, while other frequency bands can be the only frequency band for a particular pan position.

In one implementation of the histogram, each frequency band associated with a given pan position increments a count. Using the count, the histogram provides data identifying the concentration of frequencies of the audio data located at each given pan position.

As shown in FIG. 2, the system processes the histograms created for each block to generate a pan position display. For example, the pan positions calculated for each frequency band can be plotted for each block of audio data. The plotted pan positions for each block provide a visual representation of pan position over time.

Figure 4:
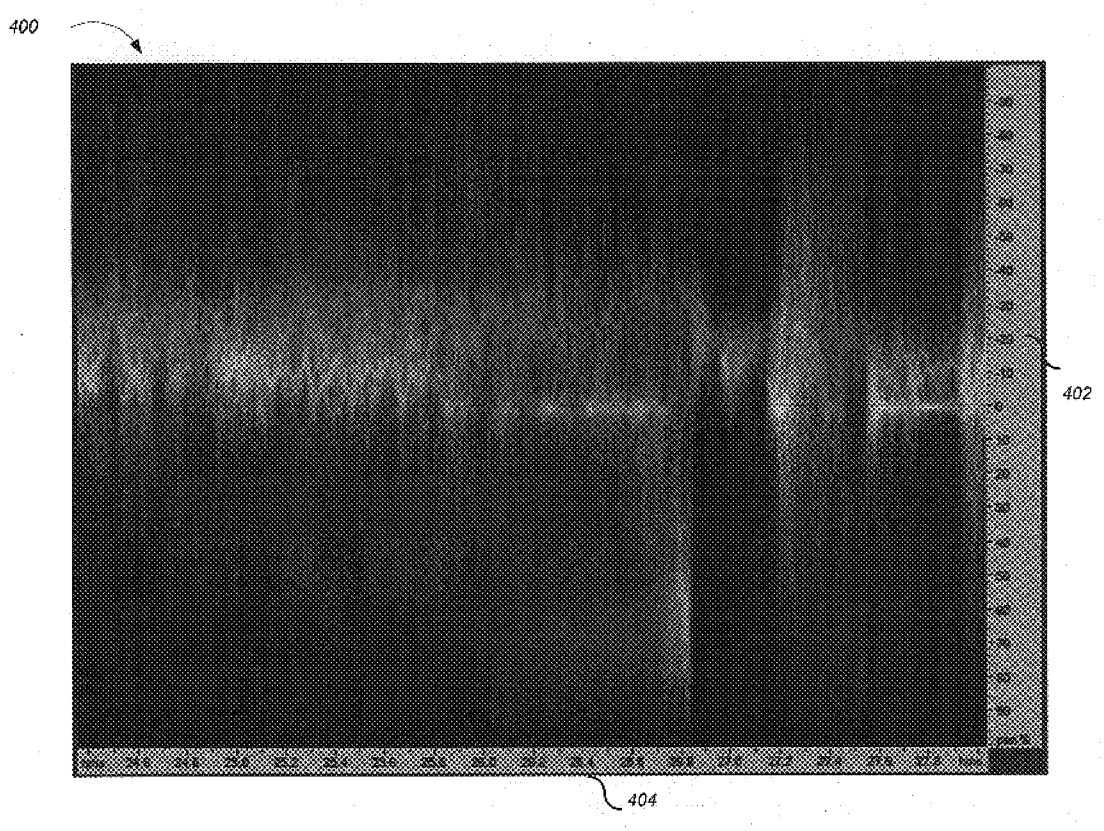
FIG. 4 shows an example pan position display of audio data.

FIG. 4 shows an example pan position display 400 of audio data. The pan position display 400 shows the pan position of audio data in the time-domain. The pan position indicates the spatial location of particular audio data at any given time in terms of relative displacement to the left or right of center. In the pan position display 400, the displacement axis 402 shows the relative displacement of particular components of the audio data to the right or the left of center as a percentage to the left or right from 0 to 100 (or −100). Thus, at any particular point in time, the audio data can include multiple different pan positions indicating audio data at various spatial locations.

In one implementation of the pan position display, the scale of the displacement axis 402 can be modified, for example by user input, in order to zoom in on a particular range of pan positions (e.g., to zoom in on audio data from just the left). The displayed audio data in the pan position display 400 is adjusted to correspond to user changes in the scale.

The pan position display 400 also includes a horizontal time axis 404. The horizontal time axis 404 shows elapsed time for the audio data (e.g., in milliseconds). As with the displacement axis 402, the time axis 404 can be modified, for example by user input, in order to zoom in on a particular time range (e.g., to zoom in on audio data corresponding to a particular time period). The displayed audio data in the pan position display 400 is adjusted to correspond to user changes in the scale.

In one implementation of the pan position display, the count information of the histogram of each block is used to illustrate the concentration of frequencies of the audio data in the pan position display. For example, the count for each pan position can be associated with a brightness level. The higher the count, the brighter the corresponding point plotted on the pan position display. Thus, the pan position display includes brighter portions indicating a greater amount of the audio data for that point in time is located at that pan position, while dimmer portions indicate less audio data at the particular pan position at that point in time.

As shown in FIG. 4, the pan position display 400 includes plotted data having varied brightness levels to indicate the concentration of the audio data located at that particular pan position. Thus, for each point in time, the brighter areas indicate that a greater concentration of frequencies of the audio data is located at that pan position. While FIG. 4 shows a color pan position display 400, in an alternative pan position display, the pan position can be plotted in gray-scale having varying brightness levels to indicate frequency concentrations of the plotted audio data.

Additionally, or alternatively, the histogram can be used to plot information associated with the frequencies at each pan position. Each frequency band can be associated with a particular color or grey-scale value. For example, each frequency band can be assigned a particular color (e.g., 100-200 Hz can be assigned "blue"). The number of colors used can vary depending on the number of frequency bands as well as according to other considerations such as a determination of a particular number of visually recognizable colors and color combinations. Alternatively, individual colors can include more than one frequency band. For example, the color blue can represent lower-end frequencies while the color red can represent higher-end frequencies, each of which may include multiple distinct frequency bands. In one implementation, the colors change smoothly across frequency bands logarithmically. For example, the colors can change as follows: 30-100 Hz (black to blue), 100-1100 Hz (blue to green), 1100-3200 Hz (green to red), and 3200-24000 Hz (red to purple). In an alternative implementation, the color changes with respect to frequency correspond to the ordering of colors of the light spectrum.

A color can then be associated with each pan position in the histogram according to the frequency bands located at each pan position. The colors associated with the frequency bands can be combined for each pan position to determine an overall color associated with the particular pan position. For example, using an additive color scheme, a pan position with frequency bands associated with two colors, red and blue, can be assigned a color of purple for the pan position. When plotting the pan position results from the histogram for each block of audio data, the corresponding color is assigned to the plotted point, resulting in a color pan position display indicating which frequencies are located at each pan position. As shown in FIG. 4, the pan position display 400 includes plotted pan position data for each point in time having varying colors indicating the particular frequencies located at particular pan positions.

In one implementation, a phase display can be generated instead of, or in addition to, a pan position display. The phase display indicates the phase difference between left and right channels of the audio data. As with the pan position display, the audio data is divided into a number of windowed blocks and an FFT is performed on each block. However, instead of comparing the amplitude between the channels for each frequency band in a block, the phase difference between the channels is computed for each frequency band in the block.

The FFT provides a complex value for each frequency band. This complex value can be used to calculate the phase value for that frequency band (i.e., phase=a tan 2(im, re)). Determining the difference between the phase values calculated for different channels (e.g., between left and right stereo channels) of the frequency band provides the phase difference for the frequency band. For example, for audio data having left and right channels, the phase difference is calculated as: a tan 2(im Left, re Left)−a tan 2(im Right, re Right). Modular arithmetic is used since phase values repeat every 360 degrees. The phase difference is calculated for each frequency band extracted from the block.

A histogram is generated relating frequency and phase difference for the audio data of each block. The histogram identifies which, and how many, frequency bands have a particular phase difference. For example, multiple frequency bands can have the same calculated phase difference, while other frequency bands can be the only frequency band having to a particular phase difference. The data from the histograms of each block are used to generate a plot of phase difference over time in a similar manner as the pan position plot above.

Figure 5:
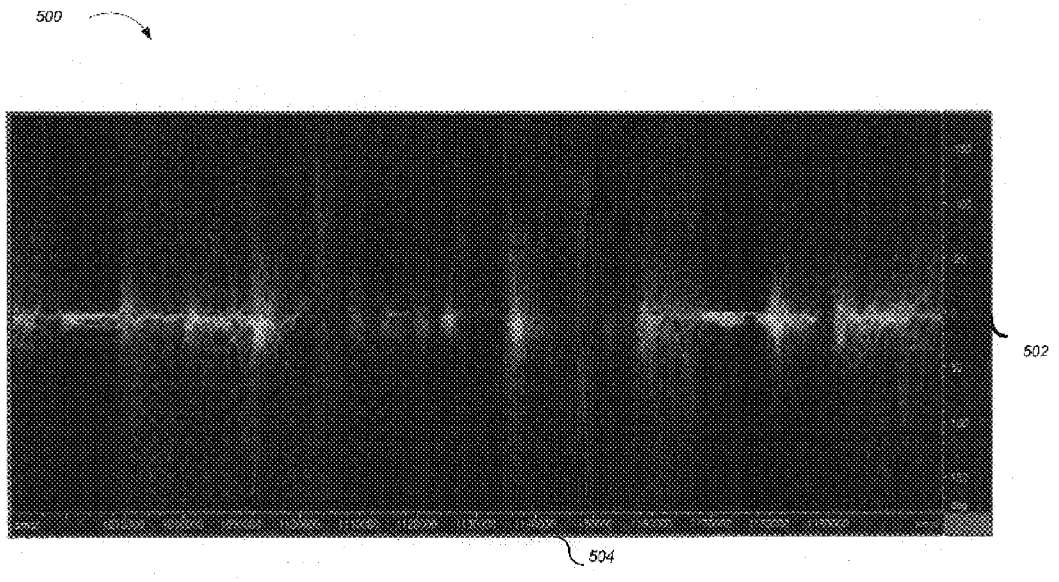
FIG. 5 shows an example phase display of audio data.

FIG. 5 shows an example phase display 500. The phase display 500 shows the phase difference of the audio data in the time-domain. The phase difference indicates the phase difference between left and right channels of particular audio data at any given time. In the pan position graph 500, the phase difference axis 502 shows the phase difference of particular components of the audio data from −180 to 180 degrees.

As with the pan position display, the scale of the phase difference axis 502 can be modified, for example by user input, in order to zoom in on a particular range of phase difference. The displayed audio data in the phase display 500 is adjusted to correspond to user changes in the scale.

The phase display 500 also includes a horizontal time axis 504. The horizontal time axis 504 shows elapsed time for the audio data (e.g., in milliseconds). As with the phase difference axis 502, the time axis 504 can be modified, for example by user input, in order to zoom in on a particular time range (e.g., to zoom in on audio data corresponding to a particular time period). The displayed audio data in the phase display 500 is adjusted to correspond to user changes in the scale.

The phase display can include concentration information in the same manner as the pan position display. The histogram count for each block can be used to indicate (e.g., using brightness levels) the concentration of the audio data having a particular phase difference. Additionally, frequency information can also be provided by the phase display in the same manner as the pan position display. For example, particular colors or grey-scale values can be assigned to represent particular frequencies such that the phase difference plotted for each point in time includes an associated color indicating the frequencies having that particular phase difference.

After displaying the audio data, the user can analyze or edit the audio data. The user can perform one or more editing operations, as discussed above, on all or a portion of the audio data using editing tools provided by the user interface. Once the user has completed editing, the user can save the edited audio file and store it for playback, transmission, or other uses.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer-readable medium for execution by, or to control the operation of, data processing apparatus. The instructions can be organized into modules in different numbers and combinations from the exemplary modules described. The computer-readable medium can be a machine-readable storage device, a machine-readable storage substrate, a memory device, a composition of matter effecting a machine-readable propagated signal, or a combination of one or more them. The term “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method, comprising:

receiving audio data; and displaying a visual representation of the audio data showing pan position, including:

calculating pan position data comprising one or more pan positions associated with audio data per unit time; and plotting the calculated pan position data using a visual spectrum corresponding to a spectrum of the audio data.

2. The method of claim 1, where calculating the pan position data comprises:

separating the audio data into a set of blocks;

performing a fast Fourier transform on each block to separate the audio data of the block into one or more frequency bands; and calculating a pan position for each frequency band.

3. The method of claim 2, where calculating a pan position for each frequency band includes comparing the amplitude of audio data associated with the frequency band corresponding to a left audio channel and a right audio channel.

4. The method of claim 2, where plotting the calculated pan position data comprises:

creating a histogram for each block relating the one or more frequency bands to pan position; and plotting pan position data over time using data from each created histogram.

5. The method of claim 1, where plotting the calculated pan position includes identifying a brightness level associated with each plotted pan position, where the brightness level indicates a relative amount of the audio data for that particular pan position at a given point in time.

6. The method of claim 1, where plotting the calculated pan position includes associating a color with each plotted pan position, where the color indicates the frequencies of the audio data for that particular pan position at a given point in time.

7. The method of claim 1, where plotting the calculated pan position includes associating a grey-scale value with each plotted pan position, where the grey-scale value indicates the frequencies of the audio data for that particular pan position at a given point in time.

8. The method of claim 1, further comprising:

receiving an input to perform one or more editing operations using the displayed audio data.

9. The method of claim 1, where plotting the calculated pan position data includes plotting discrete points representing different portions of the audio data at each of a plurality of points in time.

10. A computer-implemented method, comprising:

receiving audio data; and displaying a visual representation of the audio data showing phase difference, including:

calculating phase difference data comprising one or more phase difference values associated with audio data per unit time; and plotting the calculated phase difference data using a visual spectrum corresponding to a spectrum of the audio data.

11. The method of claim 10, where calculating phase difference data comprises:

separating the audio data into a set of blocks;

performing a fast Fourier transform on each block to separate the audio data of the block into one or more frequency bands; and calculating a phase difference for each frequency band.

12. The method of claim 11, where calculating a phase difference for each frequency band includes:

calculating the phase of audio data associated with the frequency band corresponding to a left audio channel and a right audio channel; and calculating the difference between the phase of the left audio channel and the right audio channel.

13. The method of claim 11, where plotting the calculated phase difference data comprises:

creating a histogram for each block relating the one or more frequency bands to phase difference; and plotting phase difference data over time using data from each created histogram.

14. The method of claim 10, where plotting the calculated phase difference data includes identifying a brightness level associated with each plotted phase difference, where the brightness level indicates a relative amount of the audio data for that particular phase difference at a given point in time.

15. The method of claim 10, where plotting the calculated phase difference includes associating a color with each plotted phase difference, where the color indicates the frequencies of the audio data for that particular phase difference at a given point in time.

16. The method of claim 10, where plotting the calculated phase difference includes associating a grey-scale value with each plotted phase difference, where the grey-scale value indicates the frequencies of the audio data for that particular phase difference at a given point in time.

17. The method of claim 10, where plotting the calculated phase difference data includes plotting discrete points representing different portions of the audio data at each of a plurality of points in time.

18. A computer program product, encoded on a machine-readable storage device, operable to cause data processing apparatus to perform operations comprising:

receiving audio data; and displaying a visual representation of the audio data showing pan position, including:

calculating pan position data comprising one or more pan positions associated with audio data per unit time; and plotting the calculated pan position data using a visual spectrum corresponding to a spectrum of the audio data.

19. The computer program product of claim 18, where calculating the pan position data comprises:

separating the audio data into a set of blocks;

performing a fast Fourier transform on each block to separate the audio data of the block into one or more frequency bands; and calculating a pan position for each frequency band.

20. The computer program product of claim 19, where calculating a pan position for each frequency band includes comparing the amplitude of audio data associated with the frequency band corresponding to a left audio channel and a right audio channel.

21. The computer program product of claim 19, where plotting the calculated pan position data comprises:

creating a histogram for each block relating the one or more frequency bands to pan position; and plotting pan position data over time using data from each created histogram.

22. The computer program product of claim 18, where plotting the calculated pan position includes identifying a brightness level associated with each plotted pan position, where the brightness level indicates a relative amount of the audio data for that particular pan position at a given point in time.

23. The computer program product of claim 18, where plotting the calculated pan position includes associating a color with each plotted pan position, where the color indicates the frequencies of the audio data for that particular pan position at a given point in time.

24. A computer program product, encoded on a machine readable storage device, operable to cause data processing apparatus to perform operations comprising:

receiving audio data; and displaying a visual representation of the audio data showing phase difference, including:

calculating phase difference data comprising one or more phase difference values associated with audio data per unit time; and plotting the calculated phase difference data using a visual spectrum corresponding to a spectrum of the audio data.

25. The computer program product of claim 24 where calculating phase difference data comprises:

separating the audio data into a set of blocks;

performing a fast Fourier transform on each block to separate the audio data of the block into one or more frequency bands; and calculating a phase difference for each frequency band.

26. The computer program product of claim 25, where calculating a phase difference for each frequency band includes:

calculating the phase of audio data associated with the frequency band corresponding to a left audio channel and a right audio channel, and calculating the difference between the phase of the left audio channel and the right audio channel.

27. The computer program product of claim 25, where plotting the calculated phase difference data comprises:

creating a histogram for each block relating the one or more frequency bands to phase difference; and plotting phase difference data over time using data from each created histogram.

28. The computer program product of claim 24, where plotting the calculated phase difference data includes identifying a brightness level associated with each plotted phase difference, where the brightness level indicates a relative amount of the audio data for that particular phase difference at a given point in time.

29. The computer program product of claim 24, where plotting the calculated pan position includes associating a color with each plotted phase difference, where the color indicates the frequencies of the audio data for that particular phase difference at a given point in time.

30. A system, comprising:

means for receiving audio data; and means for displaying a visual representation of the audio data showing pan position, including:

calculating pan position data comprising one or more pan positions associated with audio data per unit time, and plotting the calculated pan position data using a visual spectrum corresponding to a spectrum of the audio data.

31. A system, comprising:

a processor; and a machine readable storage device including instructions which when executed by the processor, causes the processor to generate a graphical user interface configured to present a display of audio data, including:

a first axis indicating displacement to the left and right of a center value;

a second axis indicating time; and a plot of pan position with respect to displacement and time using a visual spectrum corresponding to a spectrum of the audio data.

32. A system comprising:

a processor and a memory operable to perform operations comprising:

receiving audio data; and displaying a visual representation of the audio data showing pan position, including:

calculating pan position data comprising one or more pan positions associated with audio data per unit time, and plotting the calculated pan position data using a visual spectrum corresponding to a spectrum of the audio data.

* * * * *

UNITED STATES PATENT AND TRADEMARK OFFICE

CERTIFICATE OF CORRECTION

PATENT NO. : 7,548,791 B1
APPLICATION NO. : 11/437516
DATED : June 16, 2009
INVENTOR(S) : David E. Johnston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this

Seventh Day of September, 2010

David J. Kappos

*Director of the United States Patent and Trademark Office*